(12) United States Patent
Yoon et al.

(10) Patent No.: US 9,236,993 B2
(45) Date of Patent: Jan. 12, 2016

(54) METHOD AND APPARATUS FOR TRANSMITTING A REFERENCE SIGNAL IN A WIRELESS COMMUNICATION SYSTEM

(75) Inventors: Sung Jun Yoon, Seoul (KR); Jian Jun Li, Seoul (KR); Kyoung Min Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 171 days.

(21) Appl. No.: 14/234,086

(22) PCT Filed: Jul. 25, 2012

(86) PCT No.: PCT/KR2012/005915
§ 371 (c)(1),
(2), (4) Date: Jan. 21, 2014

(87) PCT Pub. No.: WO2013/019016
PCT Pub. Date: Feb. 7, 2013

(65) Prior Publication Data
US 2014/0185573 A1    Jul. 3, 2014

(30) Foreign Application Priority Data
Jul. 29, 2011    (KR) .................. 10-2011-0076224

(51) Int. Cl.
*H04W 4/00*    (2009.01)
*H04L 5/00*    (2006.01)
*H04J 11/00*   (2006.01)
*H04B 7/02*    (2006.01)

(52) U.S. Cl.
CPC .............. *H04L 5/0053* (2013.01); *H04B 7/024* (2013.01); *H04J 11/0053* (2013.01); *H04L 5/005* (2013.01); *H04L 5/0007* (2013.01)

(58) Field of Classification Search
CPC ............... H04W 36/0005; H04W 36/0061; H04W 36/0053; H04B 7/024; H04L 5/0053; H04L 5/005; H04L 5/0007; H04J 11/00; H04J 11/0053
See application file for complete search history.

(56) References Cited

U.S. PATENT DOCUMENTS

| 8,478,190 | B2* | 7/2013 | Sayana | H04B 7/024 455/7 |
| 2011/0077038 | A1* | 3/2011 | Montojo | H04B 7/024 455/507 |

(Continued)

FOREIGN PATENT DOCUMENTS

| WO | 2010-081166 | 7/2010 |
| WO | 2010-126316 | 11/2010 |

(Continued)

OTHER PUBLICATIONS

International Search Report issued on Feb. 25, 2013 in the International Application No. PCT/KR2012/005915.

*Primary Examiner* — Anh Ngoc Nguyen
(74) *Attorney, Agent, or Firm* — H.C. Park & Associates, PLC

(57) ABSTRACT

Provided is a method and apparatus for transmitting a reference signal by a base station in a multi-cell cooperative communication environment. The method for transmitting the reference signal according to the present invention comprises the steps of: transmitting cell ID information of a second cell to a terminal which uses a first cell as a serving cell; generating reference signal sequences in the first cell and the second cell on the basis of the same cell ID; and performing resource element mapping on each of the generated reference signals, generating signals, and transmitting the signals to the terminal, wherein the same cell ID used in generating the reference signal sequences is a cell ID of the first cell or a cell ID of the second cell.

19 Claims, 12 Drawing Sheets

(56) References Cited

U.S. PATENT DOCUMENTS

| | | |
|---|---|---|
| 2012/0033540 A1 | 2/2012 | Kim et al. |
| 2012/0113951 A1* | 5/2012 | Koo ................... H04L 5/0048 370/329 |
| 2012/0170679 A1 | 7/2012 | Koo et al. |

FOREIGN PATENT DOCUMENTS

| | | |
|---|---|---|
| WO | 2011-005537 | 1/2011 |
| WO | 2011-010904 | 1/2011 |
| WO | 2011-031079 | 3/2011 |

* cited by examiner

- - - → : Generate reference signal sequence based on cell ID=A
——→ : Generate reference signal sequence based on cell ID=B

METHOD AND APPARATUS FOR TRANSMITTING A REFERENCE SIGNAL IN A WIRELESS COMMUNICATION SYSTEM

CROSS-REFERENCE TO RELATED APPLICATIONS

This application is the National Stage Entry of International Application PCT/KR2012/005915, filed on Jul. 25, 2012 and claims priority from and the benefit of Korean Patent Application No. 10-2011-0076224, filed on Jul. 29, 2011, all of which are incorporated herein by reference in their entireties for all purposes as if fully set forth herein.

BACKGROUND

1. Field

The present invention concerns wireless communications, and more specifically, to methods and apparatuses for transmitting a reference signal in a wireless communication is system.

2. Discussion of the Background

Multi-cell cooperation has been introduced to raise performance and communication capacity of a wireless communication system. The multi-cell cooperation is also called cooperative multiple-point transmission and reception (CoMP).

Examples of CoMP include a beam avoiding scheme that mitigates interference to a user that is positioned at a cell boundary by cooperation of adjacent cells and a joint transmission scheme that transmits the same data by cooperation of adjacent cells.

A major requirement for next-generation wireless communication systems is to enhance capabilities for users that experience severe interference from an adjacent cell at a cell boundary, and in response to such requirement, CoMP may be put in consideration.

Various scenarios may be involved in such CoMP environment.

There are an intra-site CoMP environment (first scenario) where multiple cells are positioned around one base station, a high-power RRH CoMP environment (second scenario) where a plurality of high-power remote radio heads (RRHs) are positioned around one macro cell, and a low-power RRH CoMP environment where a low-power RRH is positioned around one macro cell, which includes two cases: one where the cell ID of the RRH is the same as the cell ID of the macro cell, and the other where the cell ID of the RRH is different from the cell ID of the macro cell (the latter case is third scenario, and the former case is fourth scenario).

Among such CoMP environments, in case a specific cell such as macro cell has a different cell ID from the cell IDs of RRHs constituting a CoMP set, differences between reference signal sequences that are based on their respective cell IDs may cause collisions. Therefore, a need exists for a method of addressing such collisions.

SUMMARY

An object of the present invention is to provide an apparatus and method for generating a reference signal in a wireless communication system.

Another object of the present invention is to provide an apparatus and method for transmitting a generated reference signal.

Still another object of the present invention is to provide an apparatus and method for providing information related to the cell ID of a cell used when generating a reference signal sequence to a user equipment using a cell ID indicator.

According to an aspect of the present invention, a method of transmitting a reference signal by a base station in a multi-cell cooperative communication environment comprises transmitting cell ID (identifier) information of a second cell to a UE that has a first cell as a serving cell; generating reference signal sequences in the first cell and the second cell based on the same cell ID; and resource element (RE) mapping the generated reference signal sequences, generating a reference signal, and transmitting the reference signal to the UE, wherein the same cell ID used upon generation of the reference signal sequences is a cell ID of the first cell or a cell ID of the second cell.

Transmitting the cell ID information of the second cell to the UE may include transmitting a 9-bit cell ID of the second cell through RRC (Radio Resource Control) signaling.

DCI (downlink control information) including an indicator indicating whether the same cell ID used upon generation of the reference signal sequences is a cell ID of the first cell or a cell ID of the second cell may be transmitted through a control channel.

Transmitting the cell ID information of the second cell to the UE may include is transmitting a bit value corresponding to a result of an XOR (exclusive OR) operation of the cell ID of the first cell and the cell ID of the second cell.

According to another aspect of the present invention, a method of receiving a reference signal by a UE in a multi-cell cooperative communication environment may comprise receiving cell ID information of a second cell from a base station; receiving from the first cell and the second cell reference signal sequences generated based on the same cell ID from the first cell and the second cell; and demodulating the received reference signal sequences based on the same cell ID information used upon generation of the reference signal sequences, wherein the same cell ID used upon generation of the reference signal sequences is a cell ID of the first cell or a cell ID of the second cell.

According to still another aspect of the present invention, a base station transmitting a reference signal in a multi-cell cooperative communication environment may comprise a transmitting unit transmitting cell ID information of a second cell to a UE that has a first cell as a serving cell; and a generating unit generating reference signal sequences in the first cell and the second cell based on the same cell ID, wherein the transmitting unit resource element maps the generated reference signal sequences, generate a reference signal, and transmits the reference signal to the UE, and wherein the same cell ID used upon generation of the reference signal sequences is a cell ID of the first cell or a cell ID of the second cell.

According to yet still another aspect of the present invention, a UE receiving a reference signal in a multi-cell cooperative communication environment may comprise a receiving unit receiving cell ID information of a second cell from a base station and receiving reference signal sequences generated in a first cell and the second cell based on the same cell ID from the first cell and the second cell; and a demodulating unit demodulating the received is reference signal sequences based on the same cell ID information used upon generation of the reference signal sequences, wherein the same cell ID used upon generation of the reference signal sequences is a cell ID of the first cell or a cell ID of the second cell.

According to yet still another aspect of the present invention, a method of transmitting a reference signal by a base station in a multi-cell cooperative communication environment may comprise transmitting cell ID information representing a whole multi-cell cooperative communication set to a UE having a first cell as a serving cell; generating reference signal sequences in a plurality of cells including the first cell based on the same cell ID; and resource element mapping the generated reference signal sequences, generating a reference signal, and transmitting the reference signal to the UE, wherein the same cell ID used upon generation of the reference signal sequences is a cell ID of the first cell or a cell ID of a second cell.

According to the present invention, a collision that may arise between differences between cell ID-based reference signal sequences in case the cell ID of a specific cell such as macro cell differs from cell IDs of RRHs constituting a CoMP set among CoMP environments may be addressed.

DETAILED DESCRIPTION OF THE ILLUSTRATED EMBODIMENTS

Figure 1:
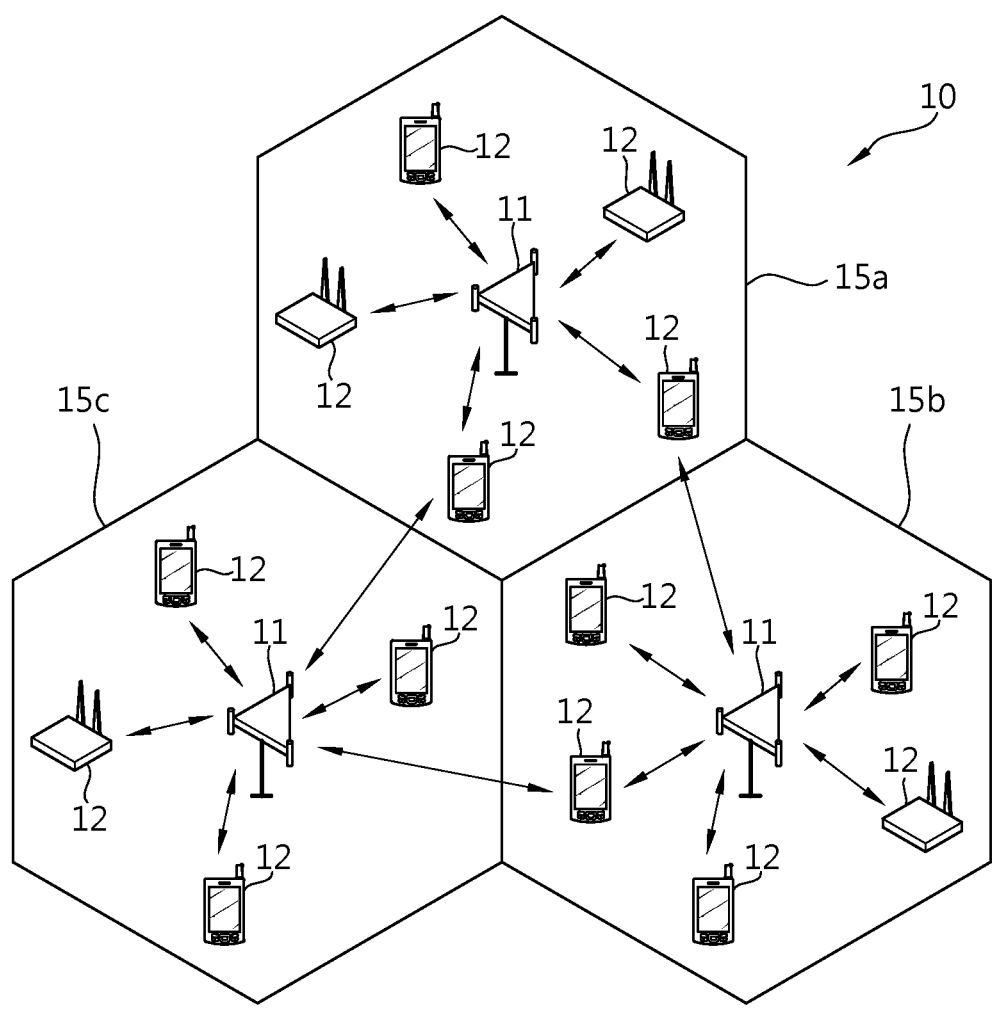
FIG. 1 illustrates a wireless communication system to which an embodiment of the present invention applies.

Hereinafter, some embodiments of this disclosure are described in detail with reference to the drawings. The same reference numerals may be used to denote the same or is substantially the same elements throughout the specification and the drawings. When determined to make the subject matter of the present invention unclear, the detailed description of know related configurations or functions is skipped.

This disclosure is described targeting a communication network, and a task that is to be performed over a communication network may be done when a system (for example, base station) that is in charge of the communication network controls the network and transmits/receives data or by a user equipment linked to the network.

FIG. 1 shows a wireless communication system to which an embodiment of the present invention applies.

Referring to FIG. 1, the wireless communication system 10 has a wide arrangement to offer various communication services such as voice and packet data. The wireless communication system 10 includes at least one base station (BS) 11.

A user equipment (UE) 12 may be stationary or mobile and may be denoted by other terms such as mobile station (MS), mobile terminal (MT), user terminal (UT), subscriber station (SS), wireless device, personal digital assistant (PDA), wireless modem, or handheld device.

The base station 11 refers to a station that is in communication with the UE 12 and may be denoted by other terms such as evolved-NodeB (eNodeB), base transceiver system (BTS), access point, femto eNB, Home eNB (HeNB), or relay. Cell should be comprehensively construed to refer to a partial area that is covered by the base station 11 and may include various coverage areas including a mega cell, a macro cell, a micro cell, a pico cell, and a femto cell.

Hereinafter, downlink (DL) denotes communication or a communication path from the base station 11 to the UE 12, and uplink (UL) denotes communication or a is communication path from the UE 12 to the base station 11. On downlink, a transmitter may be part of the base station 11, and a receiver may be part of the UE 12. On uplink, a transmitter may be part of the UE 12, and a receiver may be part of the base station 11. Multiple access schemes that apply to the wireless communication system 10 are not limited. Various multiple access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, or OFDM-CDMA may be adopted. Uplink transmission and downlink transmission may be conducted in a TDD (Time Division Duplex) scheme where transmissions are done at different times or in an FDD (Frequency Division Duplex) scheme where transmissions are done at different frequencies.

Figure 2:
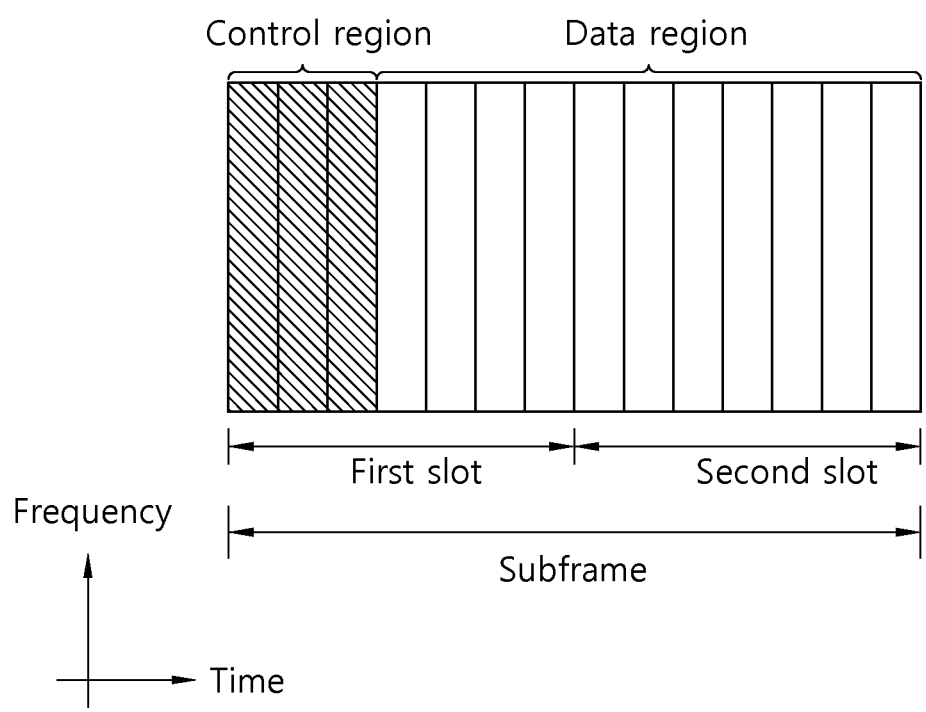
FIG. 2 illustrates the structure of a sub-frame to which an embodiment of the present invention applies.

FIG. 2 illustrates the structure of a sub-frame to which an embodiment of the present invention applies.

Referring to FIG. 2, one sub-frame includes two consecutive slots. The first one, two, three, or four OFDM symbols in the first slot of the sub-frame become a control region where a physical downlink control channel (PDCCH) is mapped, and the other OFDM symbols become a data region where a physical downlink shared channel (PDSCH) is mapped. In addition to the PDCCH, control channels such as a PCFICH (physical control format indicator to channel) and a PHICH (physical hybrid ARQ indicator channel) may be assigned. The UE may decode the PDCCH and may read control information for data transmitted through the PDSCH.

The control information mapped with the PDCCH is denoted downlink control information (DCI). The DCI may include an uplink or downlink resource allocation field, an uplink power control command field, a control field for paging, and a control field for indicating is a random access (RA) response.

The DCI has different uses depending on its format and has different fields defined therein. Table 1 shows various DCI formats.

TABLE 1

| DCI format | Description |
|---|---|
| 0 | Used for scheduling PUSCH(uplink grant) |
| 1 | Used for scheduling one PDSCH codeword in one cell |
| 1A | Used for brief scheduling of one PDSCH codeword in one cell and a random access procedure that is initialized by a PDCCH command |

TABLE 1-continued

| DCI format | Description |
|---|---|
| 1B | Used for brief scheduling of one PDSCH codeword in one cell using precoding information |
| 1C | Used for brief scheduling of one PDSCH codeword and notifying varying an MCCH |
| 1D | Used for brief scheduling of one PDSCH codeword in one cell including power offset information and precoding |
| 2 | Used for scheduling PDSCH for UE configured in spatial multiplexing mode |
| 2A | Used for PDSCH scheduling of UE configured in large-delay CDD mode |
| 2B | Used in transmission mode 8 (dual-layer transmission) |
| 2C | Used in transmission mode 9 (multi-layer transmission) |
| 3 | Used for transmission of TPC command for PUCCH and PUSCH including two-bit power control |
| 3A | Used for transmission of TPC command for PUCCH and PUSCH including single-bit power control |

Each field in the DCI is sequentially mapped with n information bits $a_0$ to $a_{n-1}$. For example, if the DCI is mapped with information bits whose total length is 44 bits, each field in the DCI is sequentially mapped with $a_0$ to $a_{43}$. DCI formats 0, 1A, 3, and 3A all may have the same payload size. DCI format 0 may also be referred to as an uplink grant.

A transmission end where the plurality of applies may include a base station, a cell, or a remote radio head. Hereinafter, the description involves an example where the party transmitting control channels is a base station. However, this is merely an example, and the party that transmits control channels may be a cell or remote radio head. In other words, all the operations performed by the base station may be done likewise by the cell or remote radio head.

Figure 3:
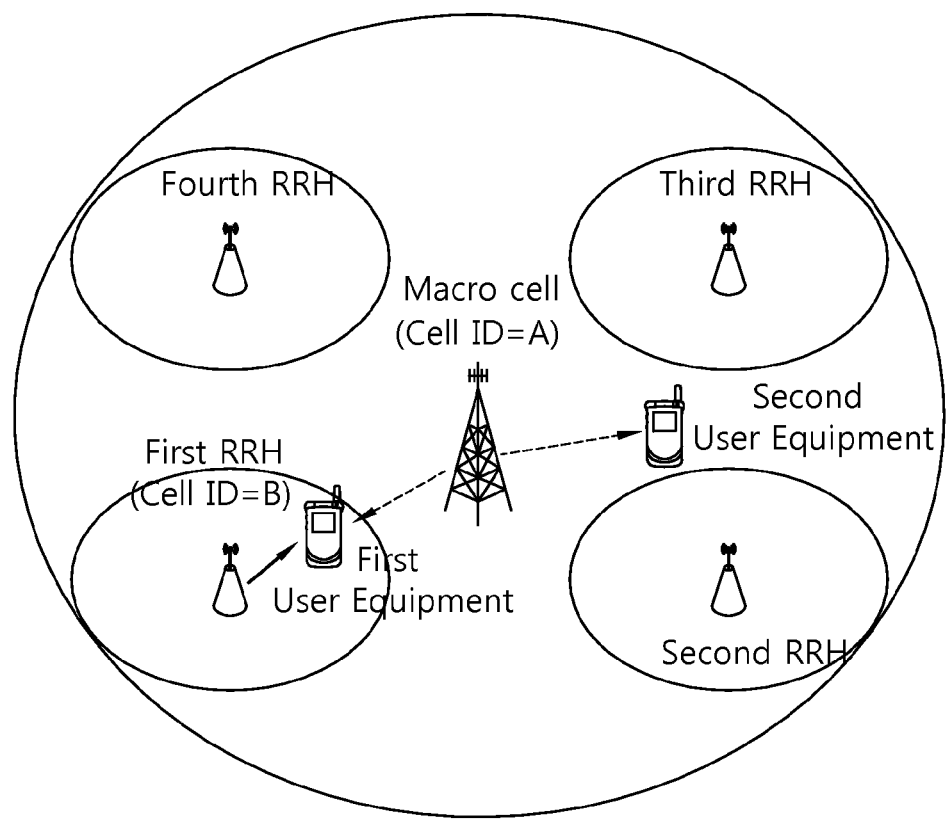
FIG. 3 illustrates an example CoMP environment to which an embodiment of the is present invention applies.

FIG. 3 shows an example CoMP environment to which an embodiment of the present invention applies. This illustrates a case where cell IDs of cells forming a CoMP set along with a macro cell or cell IDs of RRHs (Remote Radio Heads) are different from each other.

Referring to FIG. 3, a first UE has a first RRH (cell ID 'B') as a serving cell. In a general case, the first RRH generates a reference signal (RS) sequence based on its cell ID 'B,' RE (resource element) maps the generated reference signal sequence to generate a signal, and transmits the generated signal to the first UE. Further, a second UE has a macro cell (cell ID 'A') as a serving cell. In a general case, the macro cell generates a reference signal sequence based on its cell ID 'A,' RE-maps the generated reference signal sequence to generate a signal, and transmits the generated signal to the second UE.

If the first UE having the first RRH as a serving cell is under the CoMP environment (particularly, JT (Joint Transmission)-CoMP) where the first UE simultaneously receives a signal at the same time-frequency resource from the macro cell, as well as from the first RRH, the reference signal sequence generated based on the cell ID of the first RRH and the reference signal sequence generated based on the cell ID of the macro cell may have different sequence values from each other. In such case, since the reference signal sequences differ from each other, the first UE might not properly demodulate the reference signals.

Figure 4:
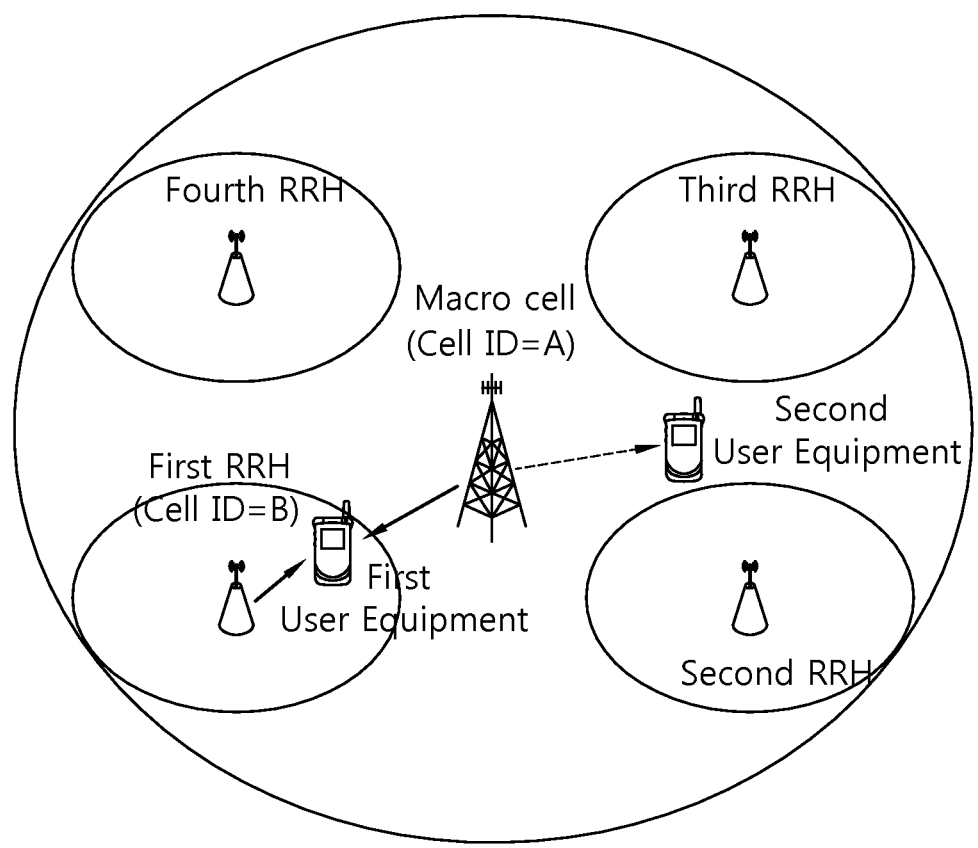
FIG. 4 illustrates another example CoMP environment to which an embodiment of the present invention applies.

FIG. 4 illustrates another example CoMP environment to which an embodiment of the present invention applies.

Referring to FIG. 4, the first RRH and the macro cell each generate the same reference signal sequence, RE-map the reference signal sequence to generate a signal, and transmit the generated signal to the first UE. At this time, the reference signal sequence is generated based on the cell ID 'B' of the first RRH. This is for preventing a failure to properly demodulating reference signals that may occur in case the first UE is under the CoMP environment (particularly, JT-CoMP) where the first UE simultaneously receives a signal at the same time-frequency resource from the macro cell as well as from the first RRH, the reference signal sequences generated based on the respective cell IDs of the first RRH and macro cell have different sequence values from each other.

Specifically, since the serving cell of the first UE is the first RRH, the first RRH, serving cell, generates a reference signal sequence based on its cell ID 'B' so as to transparently operate without other signaling or additional operation from the position of the first UE. However, the macro cell, rather than generating a reference signal sequence based on its cell ID 'A,' generates a reference signal sequence based on the cell ID 'B' of the first RRH like the first RRH.

As such, since the reference signal of the first UE is generated from a sequence generated based on the cell ID 'B' of the first RRH which is a serving cell of the first UE, the first UE may conduct demodulation in the same way as the existing one, thus eliminating the need for other signaling or additional operation for demodulation.

However, for such purpose, the time-frequency resources that the macro cell uses in order to transmit a signal to the first UE should not overlap the time-frequency resources that the macro cell uses in order to transmit a signal to all other existing UEs (for example, second UE) that communicate with the macro cell. That is, since other resources than the existing time-frequency resources for the macro cell to transmit a signal to other UEs as the first UE is subjected to a CoMP environment should be newly assigned, the time-frequency resources that may be assigned to the existing UEs are reduced by that much. Of course, before the first UE operates in the CoMP environment, the first UE receives signals only from the first RRH, so that the macro cell need not separately assign a resource to transmit a signal to the first UE.

Accordingly, the time-frequency resource that the macro cell uses to transmit a signal to the first UE may overlap the time-frequency resource that the macro cell uses to transmit a signal to a specific UE (for example, second UE) having the macro cell as a serving cell, and from the position of the macro cell, the first UE and the second UE are subjected to an MU-MIMO (multi user-multiple input multiple output) circumstance. At this time, the reference signal sequence that the macro cell transmits to the first UE differs from the reference signal sequence that the macro cell transmits to the second UE. That is, the reference signal transmitted to the first UE is generated from a sequence generated based on the cell ID 'B' of the is first RRH, and the reference signal transmitted from the second UE is generated from a sequence generated based on the cell ID 'A' of the macro cell, so that orthogonality may be broken.

Figure 5:
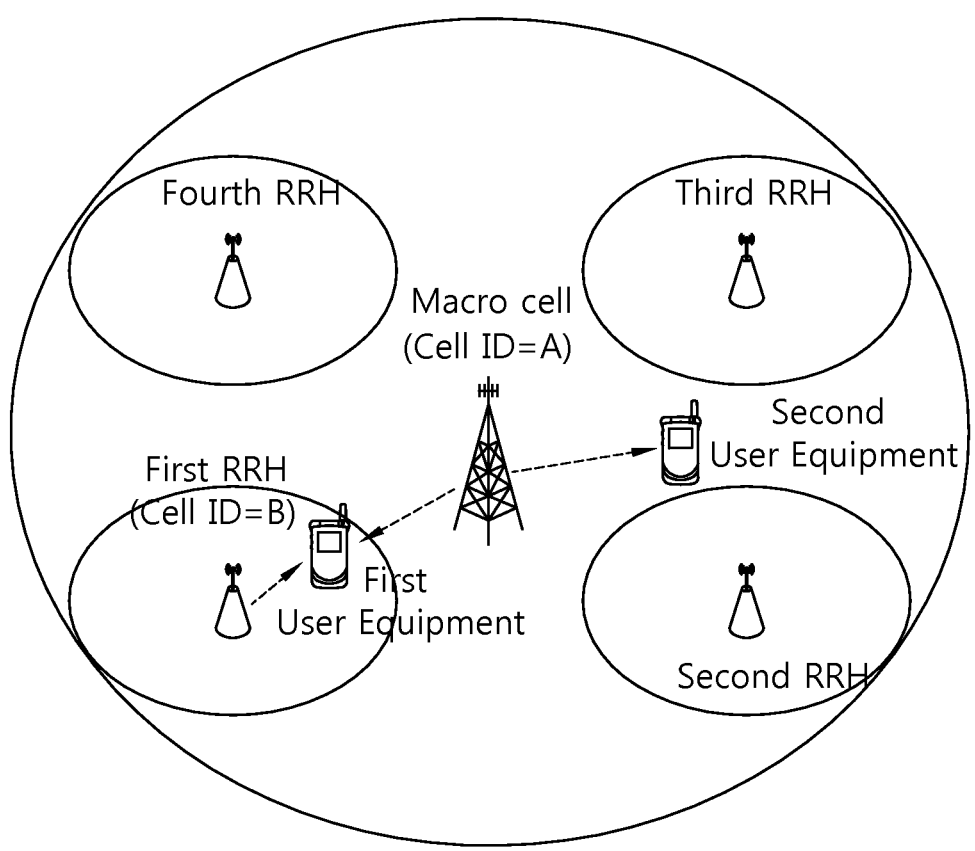
FIG. 5 illustrates an example CoMP environment where a reference signal sequence is generated according to an embodiment of the present invention.

FIG. 5 illustrates an example CoMP environment that generates a reference signal sequence according to an embodiment of the present invention.

Referring to FIG. 5, a specific UE (first UE) having a first RRH (first cell, cell ID 'A') as a serving cell has a macro cell (second cell, cell ID 'B') as a cooperative cell, and thus, the specific UE is subjected to a CoMP environment where the specific UE may receive signals from the macro cell as well as from the first RRH. At this time, the first RRH and the macro cell constitute a CoMP set. Additionally, the first UE may be subjected to an MU-MIMO environment alongside the second UE having a macro cell as a serving cell. Here, the first RRH and the macro cell, respectively, are examples of the first cell and the second cell, and the first cell and the second cell both may be macro cells or RRHs, or one of the first and second cells may be a macro cell while the other may be an RRH. Further, the first cell and the second cell may be various types of cells including pico cells.

The serving cell of the first UE is the first RRH. However, a reference signal received by the first UE is a signal generated from a sequence generated based on the cell ID 'A' of the macro cell that is a cooperative cell that forms a CoMP set. That is, the first RRH and the macro cell each transmits, to the first UE, a signal generated from a reference signal sequence generated based on the cell ID 'A' of the macro cell.

From the position of the first UE, when the reference signal sequence is demodulated, the cell ID 'A' of the macro cell, not the cell ID 'B' of the first RRH that is a serving cell, is based, and signaling and/or an operation is needed to indicate such information.

A method of signaling cell ID information from a base station to a UE in order is for the UE to be able to demodulate a reference signal sequence in a CoMP environment according to embodiments of the present invention is now described.

Figure 6:
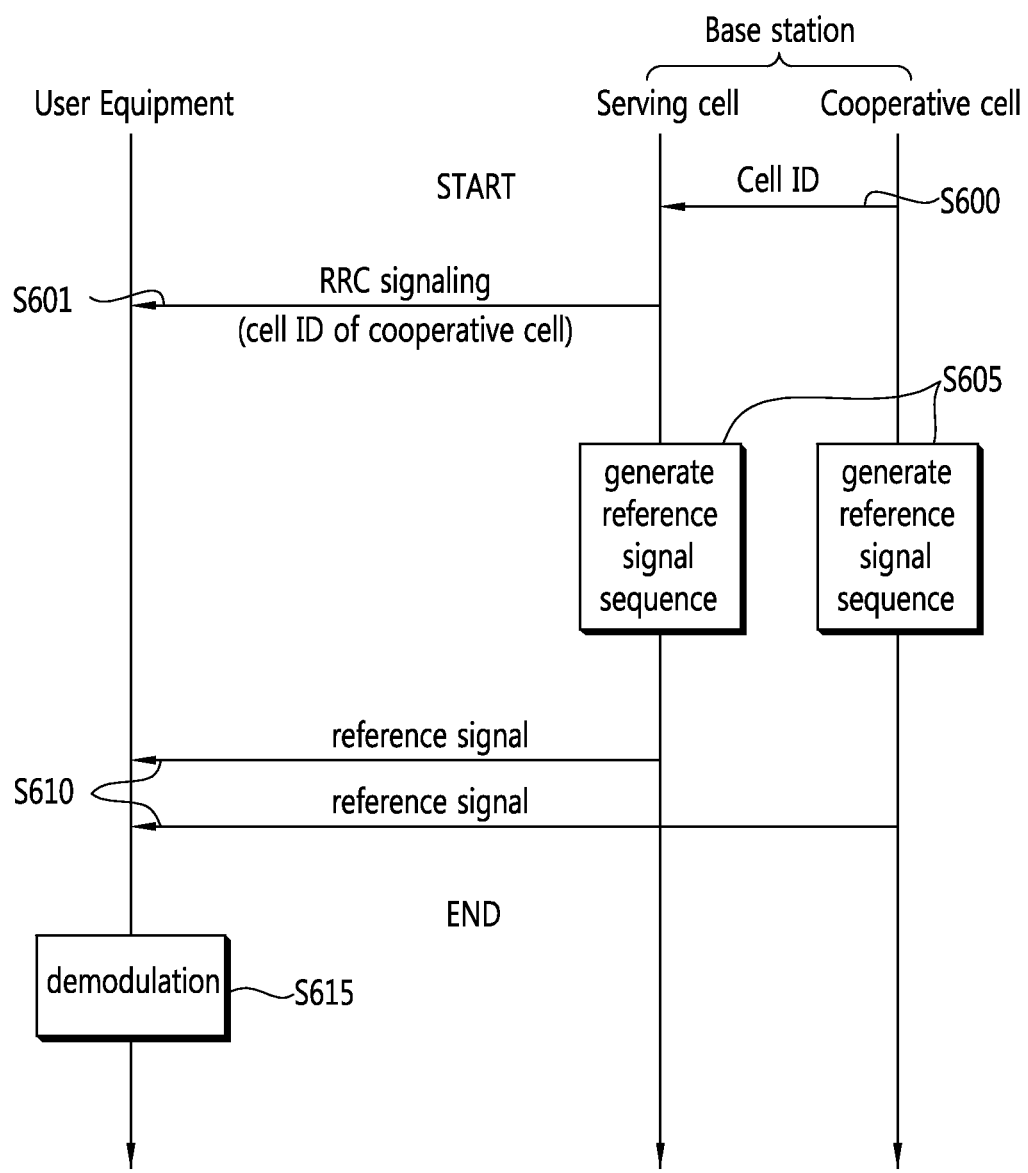
FIG. 6 illustrates signaling cell ID information for demodulating a reference signal sequence according to an embodiment of the present invention.

FIG. 6 illustrates signaling cell ID information in order to demodulate a reference signal sequence according to an embodiment (first embodiment) of the present invention.

Referring to FIG. 6, when a reference signal sequence is generated based not on a cell ID of a serving cell to which a specific UE belongs but on a cell ID of a cooperative cell (or a common cell ID for cells constituting a CoMP set) in transmitting a reference signal for the specific UE (that may correspond to the first UE shown in FIG. 5), the cell ID itself of the cooperative cell may be semi-statically transmitted to the UE. As such, the size of signaling information used for transmitting the cell ID of the cooperative cell to the UE may be, e.g., 9 bits corresponding to the size of a cell ID. The cell ID may have one of 504 values from 0 to 503 and this may be represented as 9-bit information.

By way of example, the cooperative cell transmits the cell ID to the serving cell (S600), and the serving cell may transmit the cooperative cell's cell ID to the UE through upper layer signaling such as RRC signaling (S601). At this time, an X2 or optical fiber transmission may be adopted from the cooperative cell to the serving cell.

The cell or RRHs (serving cell and cooperative cell) that transmit reference signals to the specific UE, all, generate reference signal sequences based on the cell ID of the cooperative cell (or common cell ID for the cells constituting a CoMP set) (S605) and transmit the reference signals generated through the generated reference signal sequences to the specific UE (S610), and the specific UE may demodulate the reference signals through 9-bit information corresponding to the cell ID of the cooperative cell (S615).

For example, in FIG. 5, the first RRH and the macro cell transmitting reference is signals to the first UE generates reference signal sequences based not on the cell ID 'B' of the first RRH that is a serving cell to which the first UE belongs, but on the cell ID 'A' of the macro cell, and at this time, the cell ID 'A' may be transmitted to the first UE through RRC signaling. At this time, the RRC signaling information configured to be transmitted to the UE is 9-bit information corresponding to the cell ID 'A' itself of the macro cell. In FIG. 5, the first RRH and macro cell transmitting signals to the first UE generate reference signal sequences based on the cell ID 'A' of the macro cell and generates and transmits reference signals therethrough, and send signaling information to the first UE for demodulation.

Figure 7:
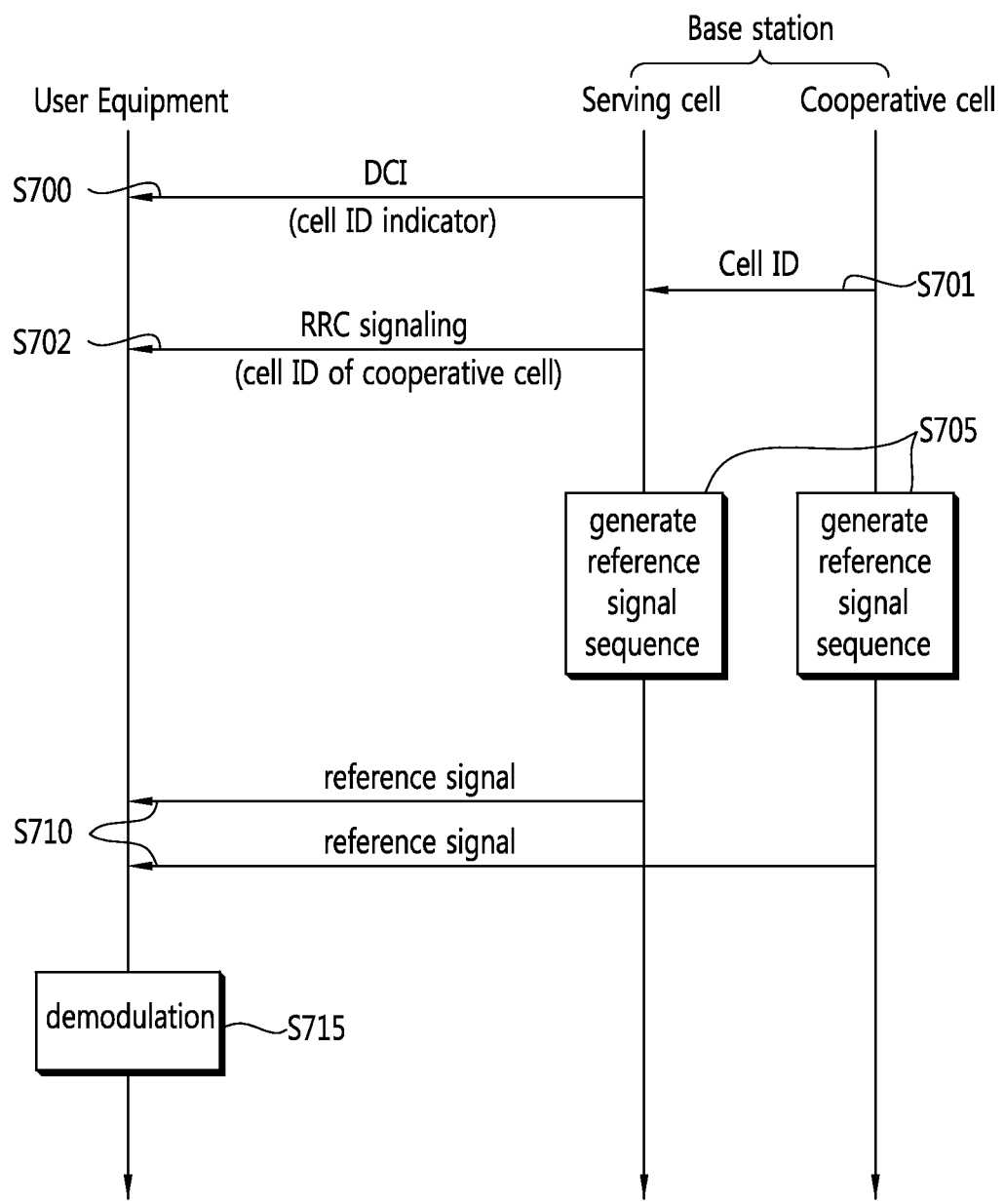
FIG. 7 illustrates signaling cell ID information for demodulating a reference signal sequence according to another embodiment of the present invention.

FIG. 7 illustrates signaling cell ID information for demodulating a reference signal sequence according to another embodiment (second embodiment) of the present invention.

Referring to FIG. 7, the base station may configure dynamic signaling of a one-bit cell ID indicator. The cell ID indicator may be inserted into control information, e.g., DCI, and may be transmitted to the UE through a control channel (for example, a PDCCH) (S700).

In case a reference signal sequence is generated based on the cell ID of a serving cell, the bit value of the one-bit cell ID indicator is set as '0.' In contrast, in case a reference signal sequence is generated based on a cell ID representing a whole CoMP set or a cell ID of a pre-designated cooperative cell, rather than being generated based on the cell ID of the serving cell, the bit value of the one-bit cell ID indicator is set as '1.'

As such, the base station transmits through the cell ID indicator to the UE information on a cell whose cell ID is a basis for generating a reference signal sequence. The base station is previously aware of such cell ID indicator, but the UE is not. Further, it is required for demodulating a reference signal sequence, so that the above-mentioned signaling is needed.

For example, in case, in FIG. 5, a reference signal is generated based on the cell ID 'B' of the first RRH, the bit value of the one-bit cell ID indicator is set as '0,' and in case, in FIG. 5, a reference signal sequence is generated based on the cell ID 'A' of a pre-designated macro cell or a cell ID representing a whole CoMP set, the bit value of the one-bit cell ID indicator may be set as '1.'

As another example, in case a reference signal sequence is generated based on the cell ID of a serving cell, the bit value of the one-bit cell ID indicator is set as '1,' and in case the cell ID indicator is configured to generate a reference signal sequence based on a cell ID representing a whole CoMP set or a cell ID of a pre-designated cooperative cell, the bit value of the one-bit cell ID indicator may be set as '0.'

At this time, unlike the method of step S700, the cell ID representing a whole CoMP set or the cell ID of a pre-designated cooperative cell may be previously transmitted to the UE semi-statistically (for example, through RRC signaling), as described above in connection with FIG. 6. If the cooperative cell sends a cell ID to the serving cell (S701), the serving cell may transmit the cell ID of the cooperative cell to the UE through RRC signaling (S702). At this time, X2 or optical fiber transmission may be adopted for transmission from the cooperative cell to the serving cell. As another example, it may be previously known to the UE over the system.

Cells or RRHs that transmit to a specific UE a signal corresponding to a one-bit cell ID indicator transmitted through dynamic signaling determine whether to generate a reference signal sequence according to the cell ID of the serving cell or based on the cell ID of the cooperative cell or cell ID representing a whole CoMP set, and then generate a reference signal sequence (S705). Based on the generated reference signal sequence, a reference signal is generated, and the generated reference signal is transmitted to a specific UE (S710), which may then demodulate the received reference signal sequence based on the cell ID indicator (S715).

For example, the cell ID indicator indicates whether the first RRH and macro cell transmitting signals to the first UE as shown in FIG. 5 generate a reference signal sequence based on the cell ID of the serving cell or based on the cell ID 'A' of the macro cell or cell ID representing a whole CoMP set.

Figure 8:
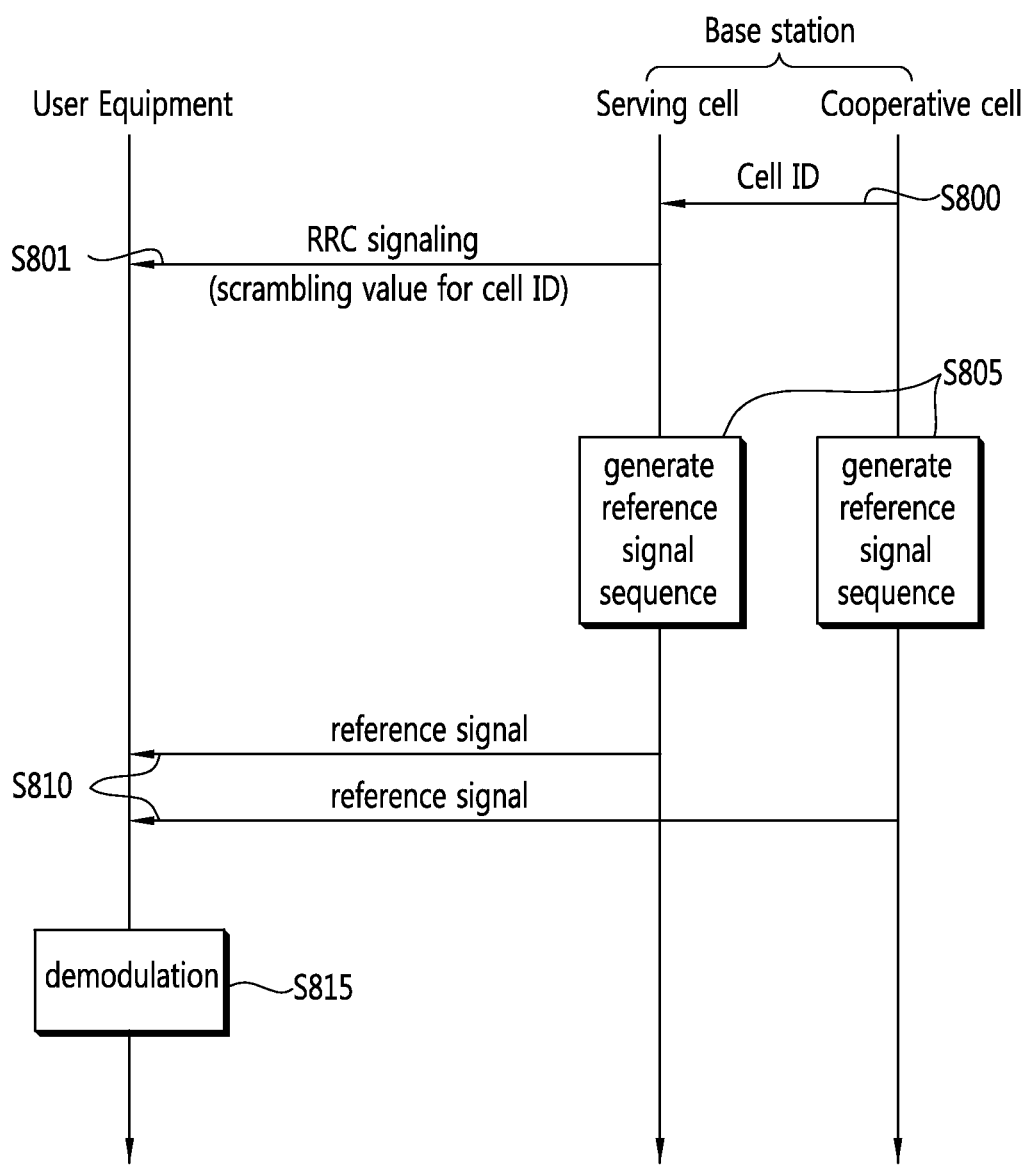
FIG. 8 illustrates signaling cell ID information for demodulating a reference signal sequence according to another embodiment of the present invention.

FIG. 8 shows signaling cell ID information for demodulating a reference signal sequence according to another embodiment (third embodiment) of the present invention.

Referring to FIG. 8, in consideration of compatibility with existing systems (backward compatibility), rather than directly transmitting the cell ID of a cooperative cell to the UE, a bit value corresponding to a difference between the cell ID of the existing serving cell and the cell ID of the cooperative cell is down to the UE. If the cell ID of the cooperative cell is sent to the serving cell (S800), the serving cell transmits a scrambling value for the cell ID to the UE through RRC signaling (S801). For example, in FIG. 5, a bit value corresponding to a difference between the cell ID 'B' of the first RRH and the cell ID 'A' of the macro cell may be down. By way of example, such bit value may be transmitted as 9-bit information in a semi-static manner (for example, RRC signaling). Hereinafter, the bit value corresponding to the difference between the cell ID of the existing serving cell and the cell ID of the cooperative cell is referred to as 'scrambling value for cell ID.' Of course, it will be apparent to those of ordinary skill in the art that such language should not limit its meaning.

A reference signal sequence is cell-specifically generated through the cell ID. In case the cell ID itself is varied, a different aspect from the current system circumstance where a specific UE generates a reference signal sequence with the cell ID of a serving cell may arise, so that sending down a scrambling value for cell ID that is a bit value corresponding to a difference between the cell ID of the existing serving cell and the cell ID of the cooperative cell, rather than directly sending the cell ID, may be meaningful.

If the cell ID of the existing serving cell is '000001011' and the cell ID of the cooperative cell is '000011001' (for example, in case in FIG. 5 the cell ID 'B' of the first RRH corresponding to the serving cell of the first UE is '000001011' and the cell ID 'A' of the macro cell corresponding to the cooperative cell of the first UE is '000011001'), the scrambling value for cell ID is '000010010.' That is, the cell ID '000011001' of the cooperative cell may be obtained by bit-to-bit adding the scrambling value '000010010' for cell ID to the cell ID '000001011' of the existing serving cell to perform a modular 2 operation. Bit-to-bit adding to perform a modular 2 operation is the same operation as an XOR (exclusive OR) operation.

In case a reference signal sequence is generated based on the cell ID of the serving cell (cell ID 'B' of the first RRH in FIG. 5), the scrambling value for cell ID is '000000000.' This value ends up with 0, and thus, might not be signaled.

Further, in case a reference signal sequence is generated based on the cell ID of the cooperative cell (cell ID 'A' of the macro cell in FIG. 5), but not on the cell ID of the serving cell (cell ID 'B' of the first RRH in FIG. 5), a bit value ('000010010' in the above example) corresponding to a difference between the cell ID of the existing serving cell and the cell ID of the cooperative cell is to be sent down as a scrambling value for cell ID.

Accordingly, the cells or RRHs (the first RRH and macro cell as shown in FIG. 5) transmitting signals to a specific UE (first UE as shown in FIG. 5) based on the scrambling value for cell ID determine whether to generate reference signal sequences based on the cell ID of the serving cell or based on the cell ID of the cooperative cell (cell ID 'A' of the macro cell as is shown in FIG. 5) or cell ID representing a whole CoMP set and generate reference signal sequences (S805). If reference signals generated through the generated reference signal sequences are transmitted to the specific UE (S810), the specific UE may demodulate the reference signal sequences based on a predetermined scrambling value for cell ID (S815).

Figure 9:
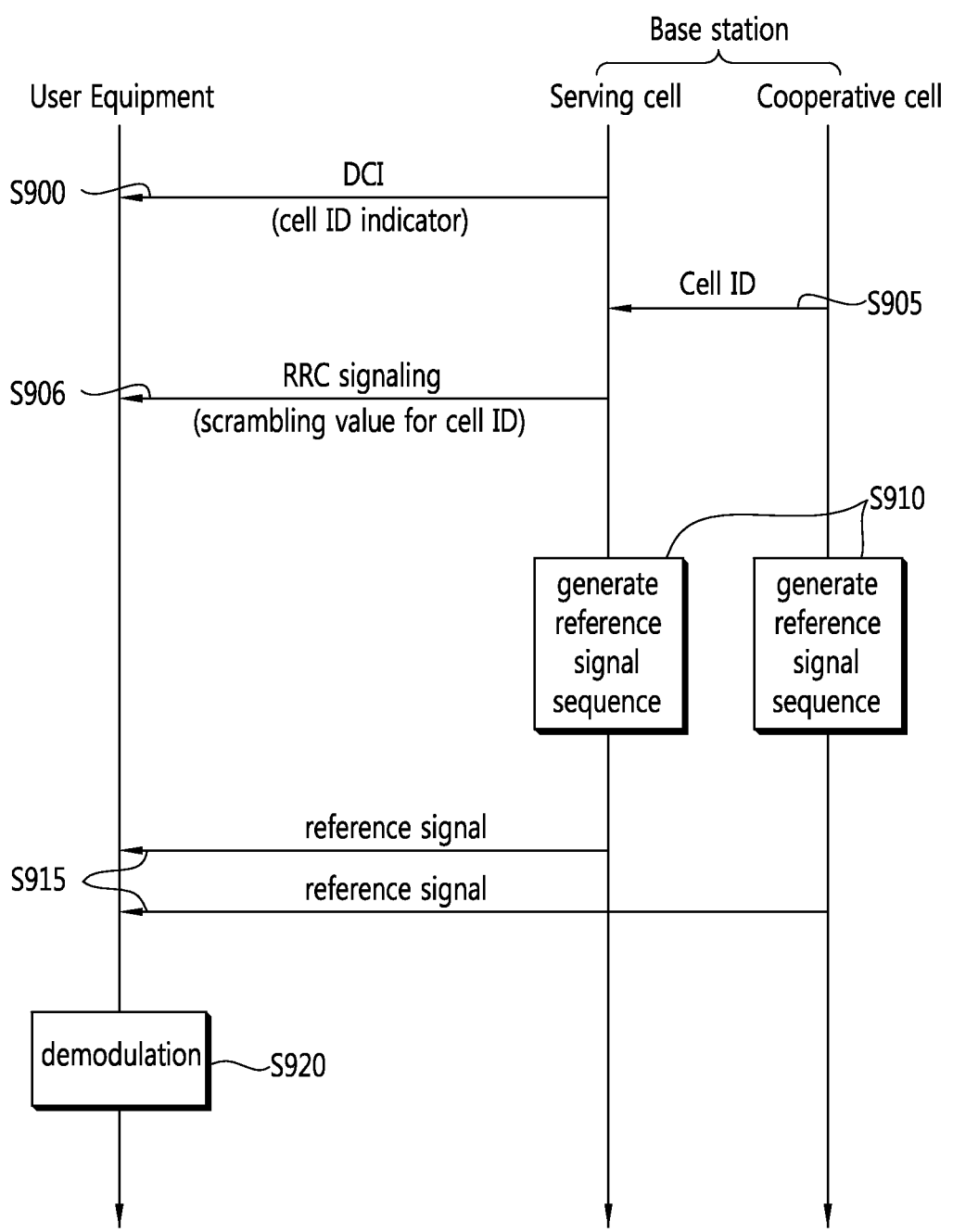
FIG. 9 illustrates transmitting cell ID information for generating a reference signal sequence according to another embodiment of the present invention.

FIG. 9 illustrates transmitting cell ID information for generating a reference signal sequence according to another embodiment (fourth embodiment) of the present invention.

Referring to FIG. 9, dynamic signaling including a one-bit cell ID indicator may be first configured. The one-bit cell ID indicator may be inserted into control information, for example, DCI (S900). If the one-bit cell ID indicator has a bit value of '0,' a reference signal sequence is generated based on the cell ID of the serving cell, and if the one-bit cell ID indicator has a bit value of 1,' a reference signal sequence is generated based not on the cell ID of the serving cell but on a pre-designated cell ID of the cooperative cell or cell ID representing a whole CoMP set. For example, if the bit value of the one-bit cell ID indicator is '0,' a reference signal sequence is generated based on the cell ID 'B' of the first RRH as shown in FIG. 5, and if the bit value is '1,' a reference signal sequence is generated based on the pre-designated cell ID 'A' of the macro cell as shown in FIG. 5 or cell ID representing a whole CoMP set. Of course, an adverse case is also possible. The cell ID indicator may be configured so that if the bit value of the one-bit cell ID indicator is '1,' a reference signal sequence is generated based on the cell ID of the serving cell, and if the bit value of the one bit is '0,' a reference signal sequence is generated based on the pre-designated cell ID of the cooperative cell or cell ID representing a whole CoMP set.

The base station is previously aware of such cell ID indicator, but the UE is not. Accordingly, the above-mentioned signaling is required for demodulating a reference signal is sequence.

At this time, the pre-designated cell ID of the cooperative cell or cell ID representing a whole CoMP set may be previously transmitted to the UE in a semi-static manner using a scrambling value, 9-bit information (for example, through RRC signaling). If the cooperative cell sends a cell ID to the serving cell (S905), the serving cell transmits the scrambling value for cell ID to the UE through RRC signaling (S906). At this time, X2 or optical fiber transmission may be adopted for transmission from the cooperative cell to the serving cell. As another example, a setting may be made to allow the UE to be previously aware of it in the system.

The UE semi-statically receives scrambling value information (or UE is previously aware of it in the system), and determines whether to follow the cell ID of the serving cell through dynamic signaling of the one-bit cell ID indicator or to follow the cell ID of the cooperative cell or cell ID representing a whole CoMP set (in this case, scrambling value information for cell ID may be used).

From the one-bit cell ID indicator transmitted through dynamic signaling, the cell or RRHs (first RRH and macro cell as shown in FIG. 5) transmitting signals to the specific UE (first UE as shown in FIG. 5) determine whether to generate a reference signal sequence based on the cell ID of the serving cell or based on the cell ID of the cooperative cell (cell ID 'A' of the macro cell as shown in FIG. 5) or cell ID representing a whole CoMP set, and based on the determination, the serving cell and the cooperative cell generate reference signal sequences (S910). Reference signals generated through the generated reference signal sequences are transmitted to the specific UE (S915). The specific UE may demodulate the reference signal sequences based on the received cell ID indicator (S920).

Meanwhile, in the above-described second and fourth embodiments, considering two cases of the cell ID of the serving cell and cell ID of the cooperative cell constituting a CoMP set (or cell ID representing a whole CoMP set) in the dynamic signaling, the cell ID indicator is configured in one bit. In case the number of cells or RRHs to simultaneously transmit signals to the specific UE at the same time-frequency resource is more than two, considering the cell IDs (or scrambling values for cell IDs) of all of the cells or RRHs, the size of information configured for dynamic signaling may be larger than one (may be two or three bits).

Meanwhile, in the first to fourth embodiments described above in connection with FIGS. 6 to 9, the reference signal may be, for example, a downlink demodulation reference signal (DL DM-RS). Of course, the reference signal is not limited to the DL DM-RS, and other reference signals may apply as well.

In case the reference signal is the DL DM-RS, a sequence of the DL DM-RS is as shown in Equation 1:

$$r(m) = \frac{1}{\sqrt{2}}(1 - 2 \cdot c(2m)) + j\frac{1}{\sqrt{2}}(1 - 2 \cdot c(2m+1))$$  [Equation 1]

where, $m =$ $$\begin{cases} 0, 1, \ldots, 12 N_{RB}^{max,DL} - 1 & \text{for normal cyclic prefix} \\ 0, 1, \ldots, 16 N_{RB}^{max,DL} - 1 & \text{for extended cyclic prefix} \end{cases}$$

$$c_{init} = (\lfloor N_s/2 + 1 \rfloor) \cdot (2 N_{ID}^{cell} + 1) \cdot 2^{16} + n_{SCID}$$

Here, the reference signal sequence r(m) for the DL DM-RS is generated from PN (pseudo noise) sequences (c(2m) and c (2m+1)) at each of the real and imaginary axes on the complex plane, and the initial values $c_{int}$ differ depending on the $N^{cell}_{ID}$ values. Thus, different reference signal sequences are generated due to the different $c_{int}$ values.

The base station RE maps the reference signal sequence generated by Equation 1, generates a signal, and transmits the signal to UEs. At this time, the cell ID, $N^{cell}_{ID}$, is in principle the cell ID of the serving cell to which the UE belongs. According to the first or is second embodiment of the present invention, the cell ID itself of the cooperative cell, not the existing cell ID of the serving cell, may apply to the cell ID $N^{cell}_{ID}$. According to the third or fourth embodiment, a value obtained by bit-to-bit adding a scrambling value for cell ID to the cell ID of the serving cell to thereby perform a modular 2 operation may apply instead of the cell ID $N^{cell}_{ID}$ in Equation 1. As such, the new cell ID newly applying according to the present invention may be referred to as $Nc^{ell}_{ID'}$.

If a one-bit cell ID indicator has a value '0,' a reference signal sequence may be generated using the existing cell ID ($N^{cell}_{ID}$), and if the one-bit cell ID indicator has a value '1,' a reference signal sequence may be generated using a new cell ID ($N^{cell}_{ID'}$) that is previously known through RRC or that the UE is aware in advance.

The cell ID indicator mentioned in the second and fourth embodiments may be inserted into control information (for example, DCI). Here, the cell ID indicator may be inserted in one bit of one of the DCI formats in Table 1 above, as defined in the current LTE system or may also be inserted into a new DCI format that is defined in the next-generation LTE to system (LTE-advanced). At this time, the size of the cell ID indicator may be one bit or more.

Table 2 below shows an example DCI format in which cell ID indicator-related information is inserted according to an embodiment of the present invention. Of course, Table 2 is merely an example, and DCI formats where a cell ID indicator may be inserted are not limited thereto.

TABLE 2

1) Carrier indicator - 0 or 3 bits
2) HARQ process number - 3 bits (FDD), 4 bits (TDD)
3) TPC command for PUCCH - 2 bits
4) Downlink Assignment Index (DAI) - 2 bits
5) Modulation and coding scheme - 5 bits TABLE 2-continued 6) New data indicator - 1 bit
7) Redundancy version - 2 bits
8) Localized/Distributed VRB assignment flag - 1 bit
9) Resource block assignment
  Localized: $\lceil \log_2 (N_{RB}^{DL} (N_{RB}^{DL} + 1)/2) \rceil$
  Distributed: $\lceil \log_2 (N_{RB}^{DL} (N_{RB}^{DL} + 1)/2) \rceil$ or
  $\lceil \log_2 (N_{RB}^{DL} (N_{RB}^{DL} + 1)/2) - 1 \rceil$
10) DM-RS port indicator - 2bits (One Codeword: Codeword 0 enabled, Codeword 1 disabled)
  00: 1 layer, port 7, nSCID = 0
  01: 1 layer, port 7, nSCID = 1
  10: 1 layer, port 8, nSCID = 0
  11: 1 layer, port 8, nSCID = 1
11) Cell ID(or scrambling value for Cell ID) for DM-RS sequence indicator - 1bit The above table shows an example DCI format that may be newly defined considering MU-MIMOs of only UEs having rank 1. The control information (DCI) where information related to the above-mentioned cell ID indicator (one bit or more) may be allocated to a PDCCH region. Further, the DCI may be allocated to the data region (for example, PDSCH region), not to the PDCCH. The data region where the DCI is allocated may be referred to as E-PDCCH (Enhanced-PDCCH) or N-PDCCH (New-PDCCH). At this time, the information related to the cell ID indicator (one bit or more) may be inserted into control information allocated for indicating information for the E-PDCCH (or N-PDCCH). For example, in order to indicate a resource region where the E-PDCCH has been allocated, the cell ID indicator may be included in the header of the PDCCH region.

Meanwhile, the cell ID (scrambling value for cell ID) indicator for the DL DM-RS sequence may be represented together with, e.g., a DM-RS port indicator. At this time, the DM-RS port indicator is changed from two bits to three bits.

Figure 10:
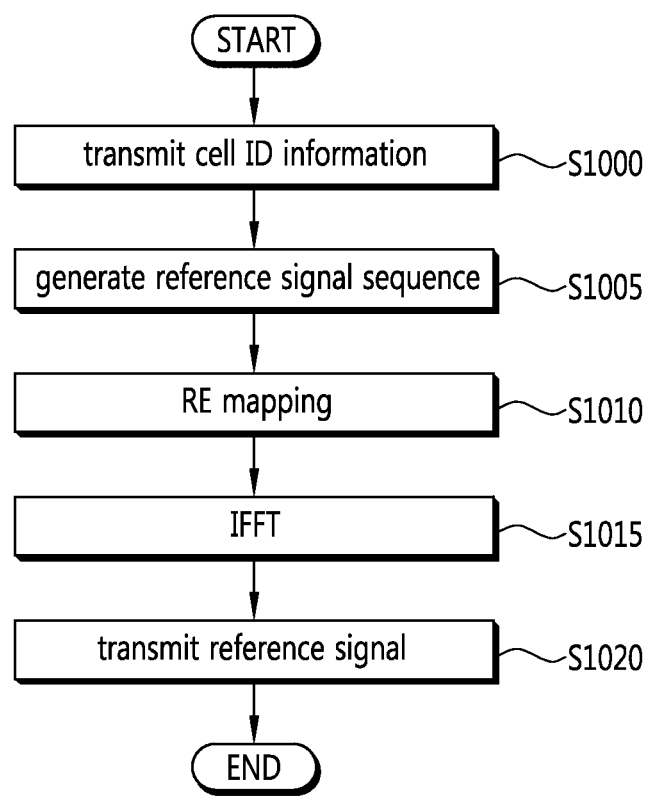
FIG. 10 is a flowchart illustrating the operation of a base station according to the present invention.

FIG. 10 is a flowchart illustrating the operation of a base station according to the present invention.

Referring to FIG. 10, each of the serving cell and the cooperative cell of the base station sends cell ID information that is a basis for generating a reference signal sequence to the UE (S1000). The base station directly transmits to the UE the cell ID used for generating a reference signal sequence according to the first to fourth embodiments, or in case the UE is previously aware of the cell ID of the cell used for generating the reference signal sequence (or cell ID representing a whole CoMP set), a cell ID indicator indicating the cell ID of the cell used for generating the reference signal sequence (or cell ID representing a whole CoMP set) is is transmitted to the UE. Or, the base station transmits to the UE a scrambling value for cell ID corresponding to a difference between the cell ID of the serving cell and the cell ID of the cell used for generating the reference signal sequence. At this time, the cell ID indicator and cell ID of the cell used for generating the reference signal sequence (or scrambling value for cell ID) may be both transmitted to the UE.

The base station generates a reference signal sequence in each of the serving cell and the cooperative cell based on the cell ID information (S1005) and RE maps the generated reference signal sequences (S1010). The RE mapping concerns which time-frequency resource the allocation is made. Subsequently, IFFT (Inverse Fast Fourier Transform) is conducted to generate a signal (S1015). The generated signal is send to the UE (S1020).

Figure 11:
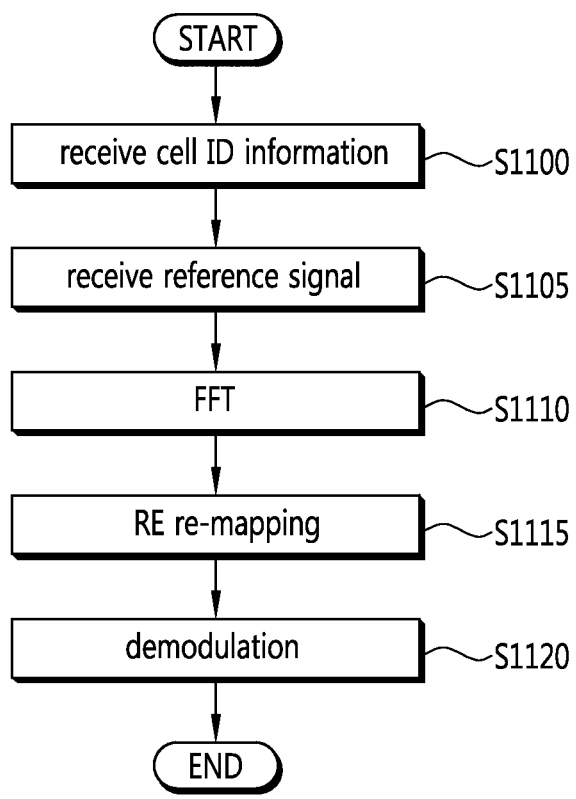
FIG. 11 is a flowchart illustrating the operation of a UE according to the present invention.

FIG. 11 is a flowchart illustrating the operation of a UE according to the present invention.

Referring to FIG. 11, the UE receives cell ID information that is a basis for the serving cell and the cooperative cell to generate their respective reference signal sequences from the base station (S1100). The UE directly receives the cell ID of the cell used upon generation of the reference signal sequence according to the first to fourth embodiments, or in case the UE is previously aware of the cell ID of the cell used upon generation of the reference signal sequence (or cell ID representing a whole CoMP set), the UE receives the cell ID indicator indicating the cell ID of the cell used upon generation of the reference signal sequence (or cell ID representing a whole CoMP set). Or, the UE receives a scrambling value for cell ID corresponding to a difference between the cell ID of the serving cell and the cell ID of the cell used upon generation of the reference signal sequence. At this time, the UE may receive both the cell ID indicator and the cell ID of the cell used upon generation of the reference signal is sequence (or scrambling value for cell ID).

The UE receives a reference signal from the base station (S1105). The UE performs FFT on the received signal (S 1110) and detects REs mapped with the reference signal sequence through RE remapping (S1115). Based on the received cell ID information, the reference signal sequence is demodulated (S1120), and channel estimation may be conducted through analysis of the demodulated reference signal sequence.

Figure 12:
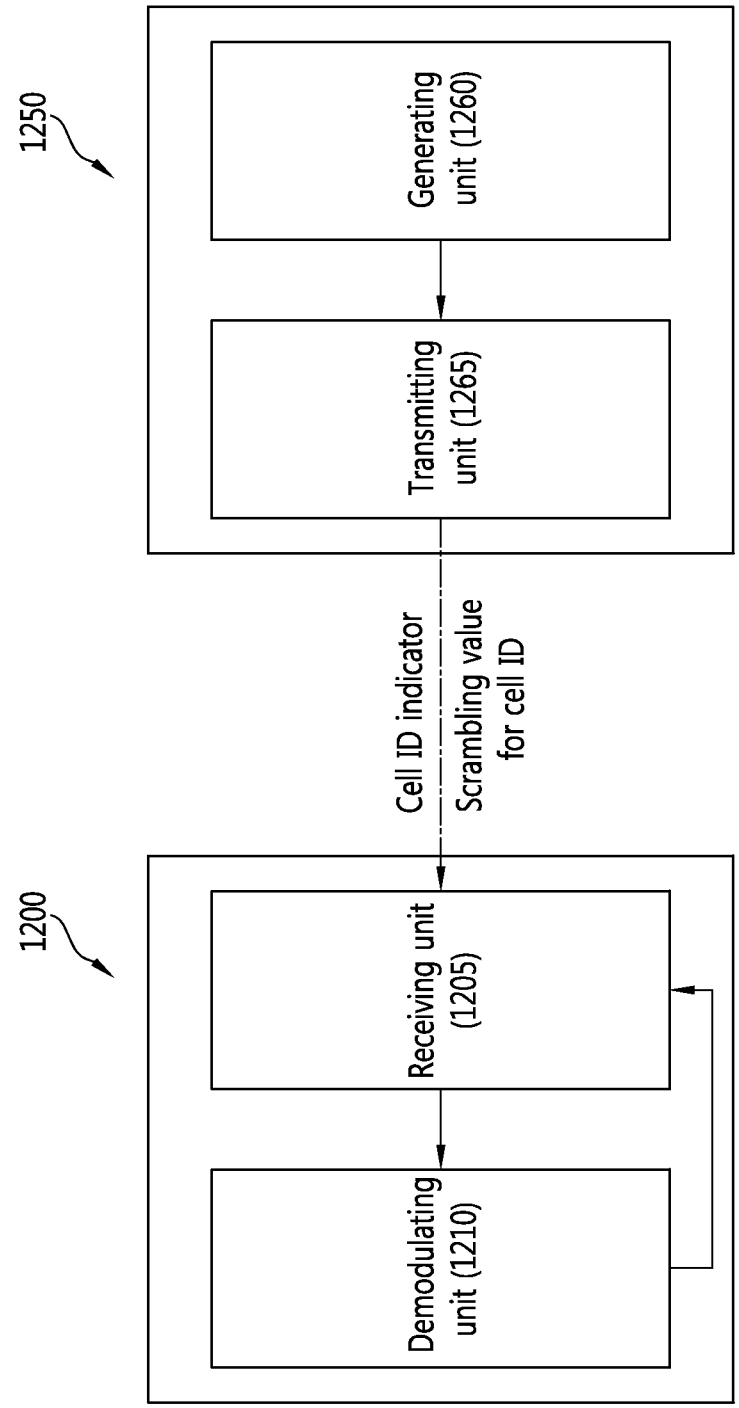
FIG. 12 is a block diagram illustrating a UE and a base station that operate according to the present invention.

FIG. 12 is a block diagram illustrating a UE and a base station that operate according to the present invention.

Referring to FIG. 12, the UE 1200 includes a receiving unit 1205 and a demodulating unit 1210.

The receiving unit 1205 may receive a cell ID itself that is used upon generation of a reference signal sequence through RRC signaling according to the above-described first to fourth embodiments or a scrambling value for cell ID and may receive DCI including a cell ID indicator through a PDCCH. Further, the receiving unit 1205 receives a signal from a serving cell and a cooperative cell.

The demodulating unit 1210 demodulates the reference signal sequence from the received signal based on the cell ID information received through the DCI or RRC signaling.

The base station 1250 includes a generating unit 1260 and a transmitting unit 1265.

The generating unit 1260 generates a reference signal sequence in the serving cell and the cooperative cell.

The transmitting unit 1265 transmits the cell ID used upon generation of the reference signal sequence to the UE. According to the first to fourth embodiments, the cell ID is itself may be transmitted through RRC signaling or scrambling value for cell ID may be transmitted, and DCI including a cell ID indicator may be transmitted through a cooperative cell such as a PDCCH.

Further, the transmitting unit 1265 RE maps the reference signal sequence to generate a reference signal and transmits the reference signal to the UE 1200.

The above-described functions may be performed by a processor, such as a microprocessor, a controller, a microcontroller, or an ASIC (Application Specific Integrated Circuit), according to program codes or software coded to fulfil the above functions. The design, development, and implementation of the codes are apparent to one of ordinary skill in the art from the description of the present invention.

Although embodiments of the present invention have been described with reference to the accompanying drawings, it will be understood by one of ordinary skill in the art that various changes in form and detail may be made thereto without departing from the scope of the present invention defined by the following claims.

The invention claimed is:

1. A method of transmitting a reference signal by a base station in a multi-cell cooperative communication environment, the method comprising:
   transmitting cell identifier (ID) information of a second cell to a user equipment (UE) that has a first cell as a serving cell;
   generating reference signal sequences in the first cell and the second cell based on the same cell ID; and
   mapping the generated reference signal sequences to a resource element (RE), generating a reference signal, and transmitting the reference signal to the UE,
   wherein the same cell ID used for generation of the reference signal sequences is a cell ID of the first cell or a cell ID of the second cell.

2. The method of claim 1, wherein the cell ID information of the second cell is 9-bit bitmap information, and wherein the 9-bit bitmap information is transmitted through Radio Resource Control (RRC) signaling.

3. The method of claim 1, further comprising:
   transmitting, through a control channel, downlink control information (DCI) including an indicator indicating whether the same cell ID used for the generation of the reference signal sequences is the cell ID of the first cell or the cell ID of the second cell.

4. The method of claim 1, wherein transmitting the cell ID information of the second cell to the UE includes transmitting a bit value corresponding to a result of an exclusive OR (XOR) operation of the cell ID of the first cell and the cell ID of the second cell.

5. A method of receiving a reference signal by a user equipment (UE) in a multi-cell cooperative communication environment, the method comprising:
   receiving cell identifier (ID) information of a second cell from a base station;
   receiving reference signal sequences generated at a first cell and the second cell based on the same cell ID from the first cell and the second cell, respectively; and
   demodulating the received reference signal sequences based on same cell ID information used for generation of the reference signal sequences,
   wherein the same cell ID used for generation of the reference signal sequences is a cell ID of the first cell or a cell ID of the second cell.

6. The method of claim 5, wherein receiving the cell ID information of the second cell from the base station includes receiving a 9-bit cell ID of the second cell through Radio Resource Control (RRC) signaling.

7. The method of claim 5, further comprising receiving, through a control channel, downlink control information (DCI) including an indicator indicating whether the same ID used for generation of the reference signal sequences is the cell ID of the first cell or the cell ID of the second cell.

8. The method of claim 5, wherein receiving the cell ID information of the second cell from the base station includes receiving a bit value corresponding to a result of an exclusive OR (XOR) operation of the cell ID of the first cell and the cell ID of the second cell.

9. A base station to transmit a reference signal in a multi-cell cooperative communication environment, the base station comprising:
   a transmitting unit to transmit cell identifier (ID) information of a second cell to a user equipment (UE) that has a first cell as a serving cell; and
   a generating unit to generate reference signal sequences in the first cell and the second cell based on the same cell ID, wherein the transmitting unit maps the generated reference signal sequences to a resource element, generates a reference signal, and transmits the reference signal to the UE, and wherein the same cell ID used for generation of the reference signal sequences is a cell ID of the first cell or a cell ID of the second cell.

10. The base station of claim 9, wherein the transmitting unit transmits a 9-bit cell ID of the second cell through Radio Resource Control (RRC) signaling.

11. The base station of claim 9, wherein the transmitting unit transmits, through a control channel, downlink control information (DCI) including an indicator indicating whether the same cell ID used for generation of the reference signal sequences is the cell ID of the first cell or the cell ID of the second cell.

12. The base station of claim 9, wherein the transmitting unit transmits a bit value corresponding to a result of an exclusive OR (X0R) operation of the cell ID of the first cell and the cell ID of the second cell.

13. A user equipment (UE) to receive a reference signal in a multi-cell cooperative communication environment, the UE comprising:

a receiving unit to receive cell identifier (ID) information of a second cell from a base station and to receive reference signal sequences generated at a first cell and the second cell based on the same cell ID from the first cell and the second cell, respectively; and a demodulating unit to demodulate the received reference signal sequences based on the same cell ID information used for generation of the reference signal sequences, wherein the same cell ID used for generation of the reference signal sequences is a cell ID of the first cell or a cell ID of the second cell.

14. The UE of claim 13, wherein the receiving unit receives a 9-bit cell ID of the second cell through Radio Resource Control (RRC) signaling.

15. The UE of claim 13, wherein the receiving unit receives, through a control channel, downlink control information (DCI) including an indicator indicating whether the same cell ID used for generation of the reference signal sequences is the cell ID of the first cell or the cell ID of the second cell.

16. The UE of claim 13, wherein the receiving unit receives a bit value corresponding to a result of an exclusive OR (XOR) operation of the cell ID of the first cell and the cell ID of the second cell.

17. A method of transmitting a reference signal by a base station in a multi-cell cooperative communication environment, the method comprising:

transmitting cell identifier (ID) information representing a whole multi-cell cooperative communication set to a user equipment (UE) having a first cell as a serving cell;

generating reference signal sequences in a plurality of cells including the first cell based on the same cell ID; and mapping the generated reference signal sequences to a resource element, generating a reference signal, and transmitting the reference signal to the UE, wherein the same cell ID used for generation of the reference signal sequences is a cell ID of the first cell or a cell ID of a second cell.

18. The method of claim 17, wherein transmitting the cell ID information representing the whole multi-set cooperative communication set to the UE includes transmitting a 9-bit cell ID representing the whole multi-cell cooperative communication set through Radio Resource Control (RRC) signaling.

19. The method of claim 17, further comprising transmitting, through a control channel, downlink control information (DCI) including an indicator indicating whether the same cell ID used for generation of the reference signal sequences is the cell ID of the first cell or the cell ID representing the whole multi-cell cooperative communication set.

* * * * *